United States Patent
Adeeb et al.

(10) Patent No.: US 10,090,762 B2
(45) Date of Patent: Oct. 2, 2018

(54) DIRECT CURRENT (DC) VOLTAGE CONVERTER OPERATION MODE TRANSITION

(71) Applicant: RF Micro Devices, Inc., Greensboro, NC (US)

(72) Inventors: Mohammad Ahsanul Adeeb, High Point, NC (US); Philippe Gorisse, Brax (FR); Nadim Khlat, Cugnaux (FR); Michael R. Kay, Summerfield, NC (US)

(73) Assignee: Qorvo US, Inc., Greensboro, NC (US)

( * ) Notice: Subject to any disclaimer, the term of this patent is extended or adjusted under 35 U.S.C. 154(b) by 42 days.

(21) Appl. No.: 14/831,080

(22) Filed: Aug. 20, 2015

(65) Prior Publication Data

US 2016/0056705 A1 Feb. 25, 2016

Related U.S. Application Data

(60) Provisional application No. 62/040,586, filed on Aug. 22, 2014.

(51) Int. Cl.
*H02M 3/156* (2006.01)
*H02M 3/158* (2006.01)

(52) U.S. Cl.
CPC ......... *H02M 3/1582* (2013.01); *H02M 3/156* (2013.01)

(58) Field of Classification Search
None
See application file for complete search history.

(56) References Cited

U.S. PATENT DOCUMENTS

| | | | |
|---|---|---|---|
| 6,295,216 B1* | 9/2001 | Faria | H02M 1/12 307/105 |
| 2007/0013350 A1* | 1/2007 | Tang | H02M 3/1584 323/237 |
| 2011/0122660 A1* | 5/2011 | Cacciotto | H02M 3/33515 363/21.18 |
| 2012/0274295 A1* | 11/2012 | Lin | H02M 3/1582 323/282 |
| 2013/0249519 A1* | 9/2013 | Zhao | G05F 1/46 323/284 |
| 2014/0077870 A1* | 3/2014 | Liu | H02M 3/1582 327/540 |

(Continued)

*Primary Examiner* — Jeffrey Gblende
(74) *Attorney, Agent, or Firm* — Withrow & Terranova, P.L.L.C.

(57) ABSTRACT

A direct current (DC) voltage converter configured to transition between operation modes is disclosed. A voltage selection circuitry is provided in a DC voltage conversion circuit to control a buck-boost converter that generates a DC output voltage. As opposed to conventional methods of switching the buck-boost converter between a buck mode and a boost mode based on a single switching threshold, the voltage selection circuitry is configured to switch the buck-boost converter between the buck mode and the boost mode based on multiple voltage thresholds. Each of the multiple voltage thresholds defines a respective range for the DC output voltage. By controlling the buck-boost converter based on multiple voltage thresholds, it is possible to provide a smoother transition between the buck mode and the boost mode, thus reducing voltage errors in the DC output voltage and improving reliability of the DC voltage conversion circuit.

20 Claims, 8 Drawing Sheets

(56) References Cited

U.S. PATENT DOCUMENTS

2014/0217998 A1* 8/2014 Krueger .................. G05F 1/46
323/273
2016/0006350 A1* 1/2016 Matthew ............... H02M 3/158
323/271

* cited by examiner

DIRECT CURRENT (DC) VOLTAGE CONVERTER OPERATION MODE TRANSITION

PRIORITY APPLICATION

This application claims the benefit of U.S. provisional patent application No. 62/040,586, filed Aug. 22, 2014, which is incorporated herein by reference in its entirety.

FIELD OF THE DISCLOSURE

The technology of the disclosure relates generally to a direct current (DC) voltage conversion circuit including a buck-boost DC-to-DC voltage converter.

BACKGROUND

Mobile communication devices have become increasingly common in current society. The prevalence of these mobile communication devices is driven in part by the many functions that are now enabled on such devices. Demand for such functions increases the processing capability requirements for the mobile communication devices. As a result, increasingly complex integrated circuits (ICs) have been designed and manufactured to provide increasingly greater functionality in the mobile communication devices.

A mobile communication device often requires multiple functional ICs to function concurrently so as to provide higher processing speed, richer multimedia experience, and constant connectivity to end users. Each of the multiple functional ICs may be designed to operate at a respective direct current (DC) voltage level. As such, switched mode power supply (SMPS) is often employed in the mobile communication device to regulate DC voltage levels supplied to the multiple functional ICs.

One such SMPS is known as a buck-boost DC-to-DC converter. The buck-boost DC-to-DC converter generates a DC output voltage based on a DC input voltage. The buck-boost DC-to-DC converter can be controlled to operate in either a buck mode or a boost mode. When in the buck mode, the buck-boost DC-to-DC converter generates the DC output voltage that is less than or equal to the DC input voltage. In contrast, the buck-boost DC-to-DC converter generates the DC output voltage that is greater than or equal to the DC input voltage when operating in the boost mode.

SUMMARY

Aspects disclosed in the detailed description include direct current (DC) voltage converter operation mode transition. A voltage selection circuitry is provided in a DC voltage conversion circuit to control a buck-boost converter that generates a DC output voltage. As opposed to conventional methods of switching the buck-boost converter between a buck mode and a boost mode based on a single switching threshold, the voltage selection circuitry is configured to switch the buck-boost converter between the buck mode and the boost mode based on multiple voltage thresholds. Each of the multiple voltage thresholds defines a respective range for the DC output voltage. By controlling the buck-boost converter based on multiple voltage thresholds, it is possible to provide a smoother transition between the buck mode and the boost mode, thus reducing voltage errors in the DC output voltage and improving reliability of the DC voltage conversion circuit.

In one aspect, a DC voltage conversion circuit is provided. The DC voltage conversion circuit comprises a buck-boost converter configured to generate a DC output voltage based on a DC input voltage provided by a voltage source. The DC voltage conversion circuit also comprises a voltage selection circuitry. The voltage selection circuitry is configured to compare a DC voltage feedback against a plurality of voltage thresholds. The voltage selection circuitry is also configured to generate a plurality of voltage selection signals that collectively define a lower boundary and an upper boundary of the DC output voltage. The DC voltage conversion circuit also comprises a voltage control circuitry configured to control the buck-boost converter to generate the DC output voltage between the lower boundary and the upper boundary defined by the plurality of voltage selection signals.

Those skilled in the art will appreciate the scope of the disclosure and realize additional aspects thereof after reading the following detailed description in association with the accompanying drawings.

BRIEF DESCRIPTION OF THE DRAWINGS

The accompanying drawings incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the disclosure and illustrate the best mode of practicing the disclosure. Upon reading the following description in light of the accompanying drawings, those skilled in the art will understand the concepts of the disclosure and will recognize applications of these concepts not particularly addressed herein. It should be understood that these concepts and applications fall within the scope of the disclosure and the accompanying claims.

Aspects disclosed in the detailed description include direct current (DC) voltage converter operation mode transition. A voltage selection circuitry is provided in a DC voltage conversion circuit to control a buck-boost converter that generates a DC output voltage. As opposed to conventional methods of switching the buck-boost converter between a buck mode and a boost mode based on a single switching threshold, the voltage selection circuitry is configured to switch the buck-boost converter between the buck mode and the boost mode based on multiple voltage thresholds. Each of the multiple voltage thresholds defines a respective range for the DC output voltage. By controlling the buck-boost converter based on multiple voltage thresholds, it is possible to provide a smoother transition between the buck mode and the boost mode, thus reducing voltage errors in the DC output voltage and improving reliability of the DC voltage conversion circuit.

Figure 1:
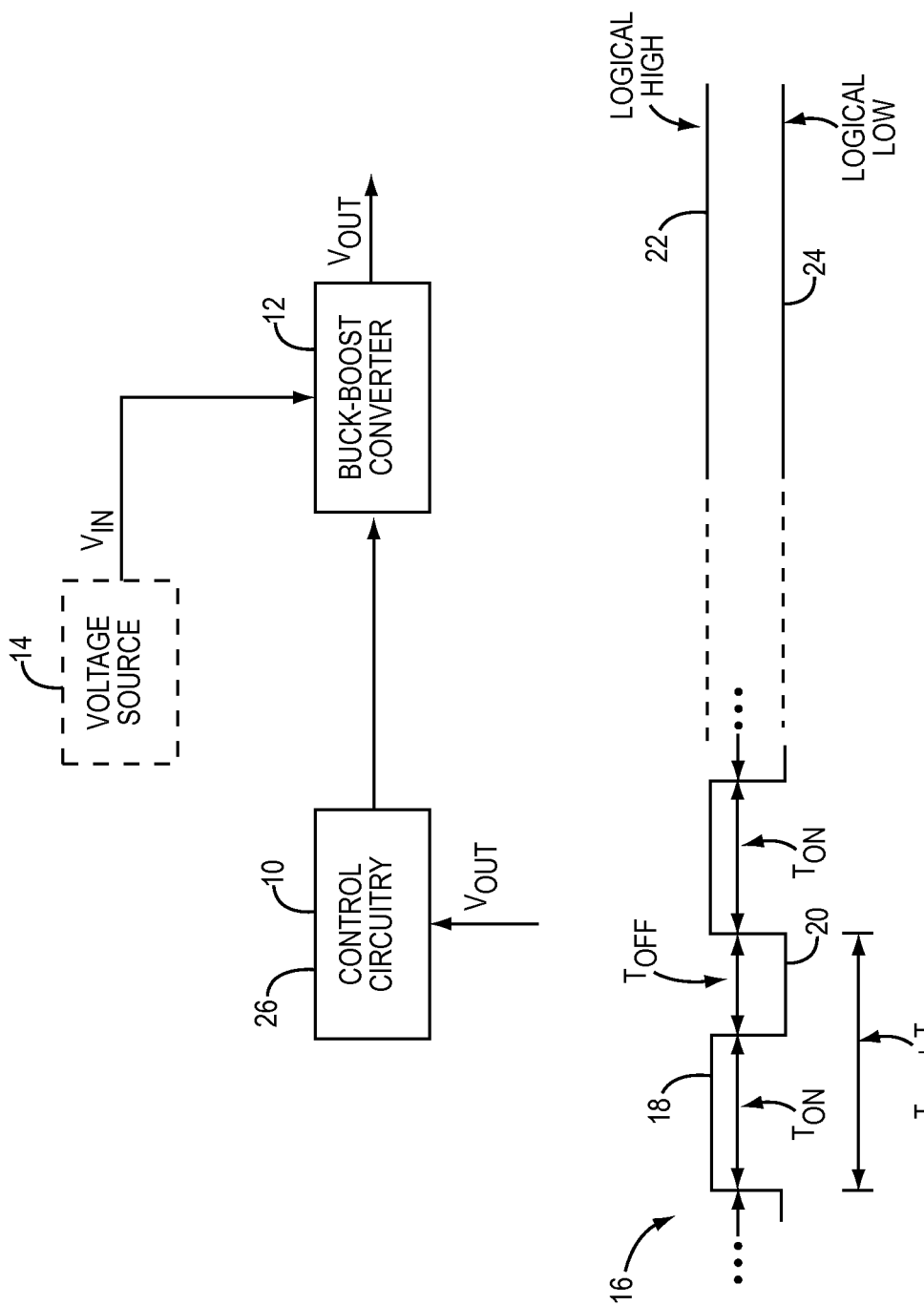
FIG. 1 is a schematic diagram of an exemplary conventional control circuitry configured to switch a buck-boost converter between a buck mode and a boost mode based on a single switching threshold.
Figure 2A:
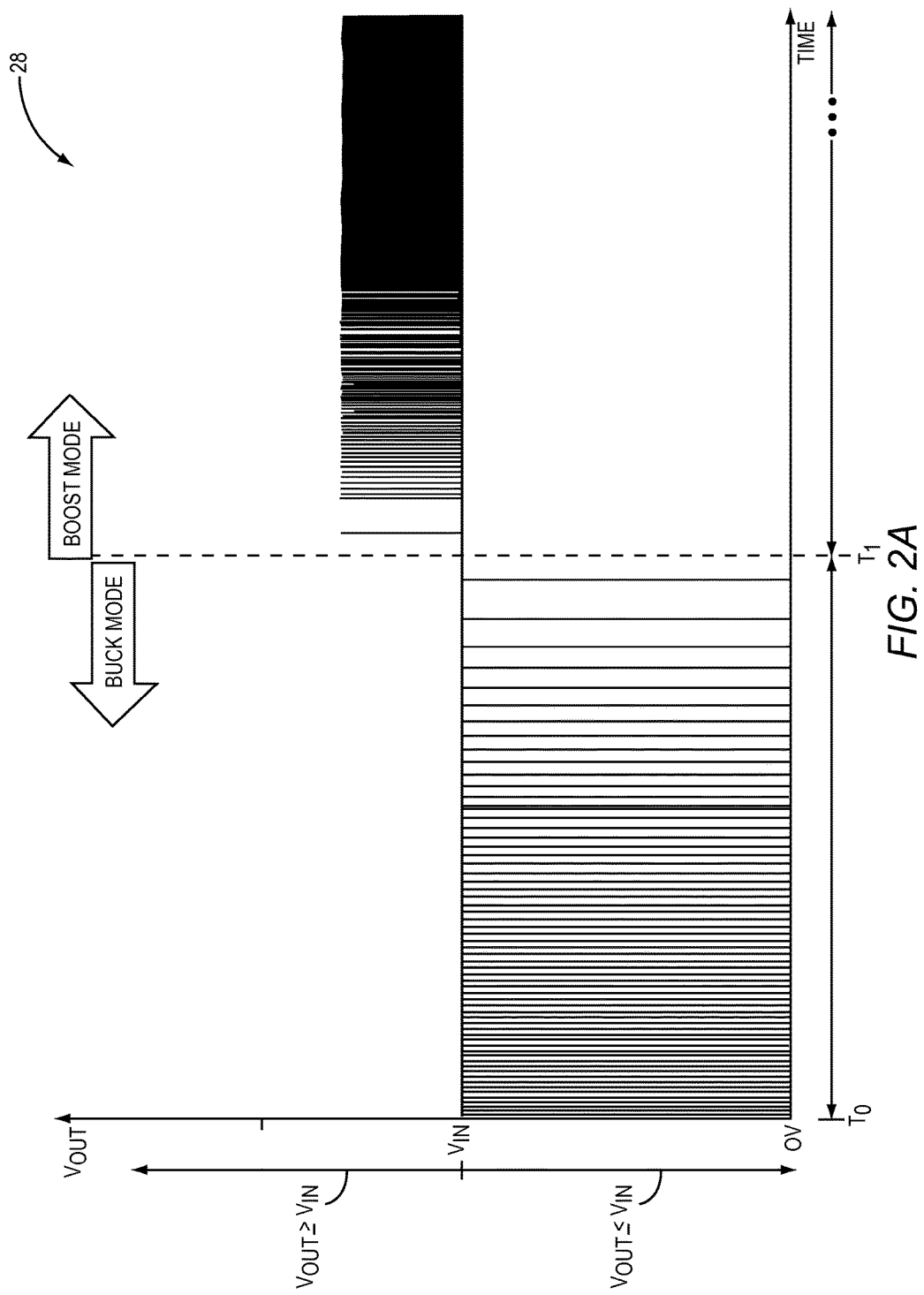
FIG. 2A is an exemplary graph illustrating an abrupt change in direct current (DC) output voltage when a bang-bang controller (BBC) in the conventional control circuitry of FIG. 1 switches the buck-boost converter from the buck mode to the boost mode.
Figure 2B:
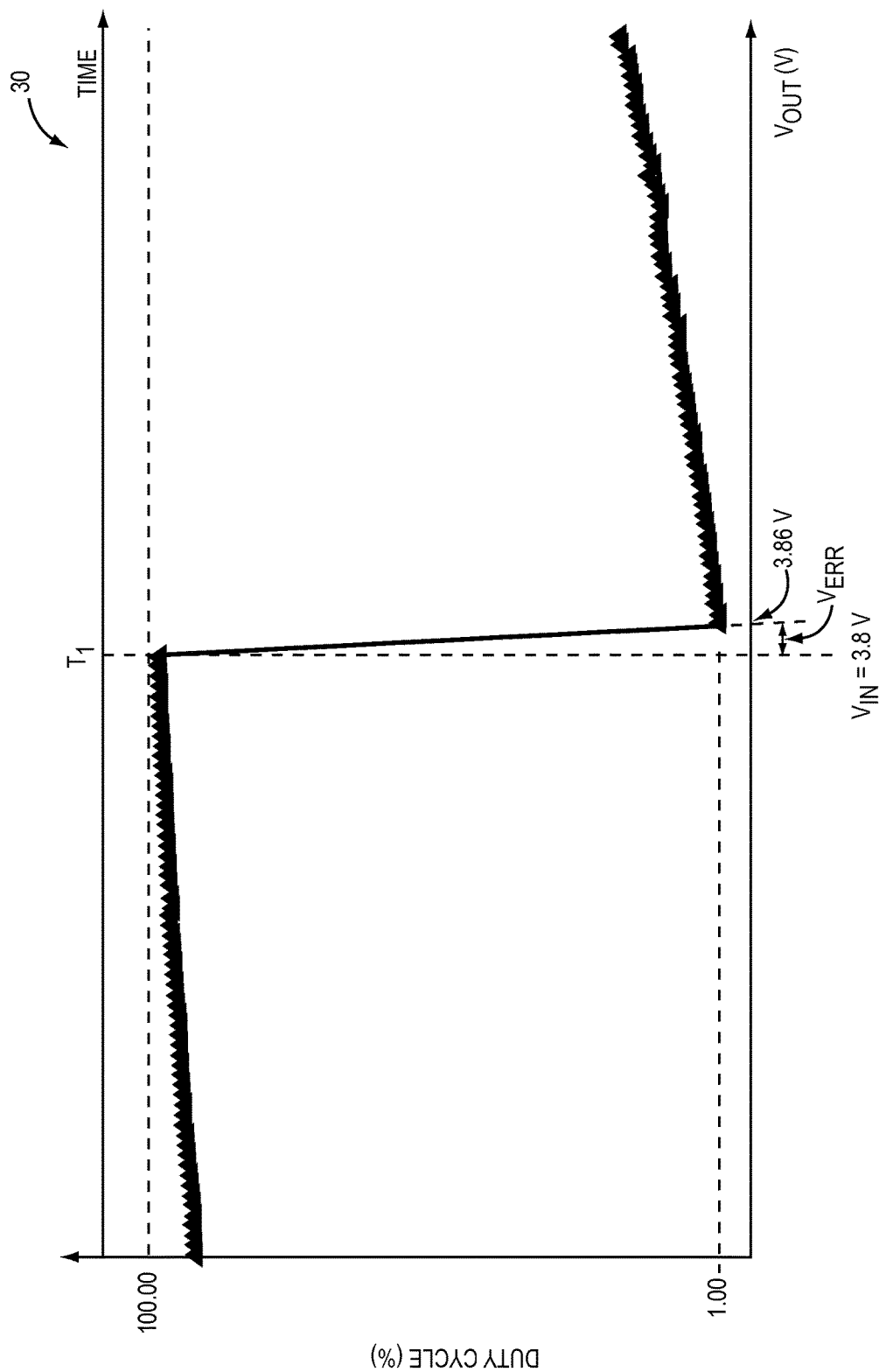
FIG. 2B is an exemplary graph illustrating a voltage error caused by the BBC of FIG. 2A when switching the buck-boost converter of FIG. 1 from the buck mode to the boost mode.

Before discussing the DC voltage conversion circuit of the present disclosure, a brief overview of a conventional control circuitry that can cause significant voltage error when switching a buck-boost converter between a buck mode and a boost mode is provided with references to FIGS. 1, 2A, and 2B. The discussion of specific exemplary aspects of reducing voltage error when switching the buck-boost converter between the buck mode and the boost mode starts below with reference to FIG. 3.

In this regard, FIG. 1 is a schematic diagram of an exemplary conventional control circuitry 10 configured to switch a buck-boost converter 12 between a buck mode and a boost mode based on a single switching threshold.

With reference to FIG. 1, the buck-boost converter 12 is configured to generate a DC output voltage (sometimes referred to as $V_{OUT}$) based on a DC input voltage (sometimes referred to as $V_{IN}$) provided by a voltage source 14. In this regard, the buck-boost converter 12 is also known as a buck-boost DC-to-DC voltage converter. The buck-boost converter 12 is configured to operate in a buck mode or a boost mode. Both the buck mode and the boost mode are operatively driven by a square wave 16. The square wave 16 alternates between an on period 18, which corresponds to logical HIGH, and an off period 20 that corresponds to logical LOW. The on period 18 has a respective duration $T_{ON}$ and the off period 20 has a respective duration $T_{OFF}$. As such, duty-cycle (sometimes referred to as D) of the square wave 16 can be determined by equation Eq. 1 below.

$$D = T_{ON}/(T_{ON}+T_{OFF}) \qquad \text{(Eq. 1)}$$

According to the equation Eq. 1, the duty-cycle is one hundred percent (100%) when $T_{OFF}$ equals zero (0). In this regard, the square wave 16 becomes a continuous wave 22 corresponding only to the logical HIGH. In contrast, the duty-cycle is zero percent (0%) when $T_{ON}$ equals 0. In this regard, the square wave 16 becomes a continuous wave 24 corresponding only to the logical LOW. The duty-cycle is fifty percent (50%) when $T_{ON}$ and $T_{OFF}$ are equal.

When the buck-boost converter 12 is operating in the buck mode without supplying electrical current (not shown) to a load circuit (not shown), the DC output voltage is proportionally related to the DC input voltage and the duty-cycle and can be expressed by equation Eq. 2 below.

$$V_{OUT} = V_{IN} \times D \qquad \text{(Eq. 2)}$$

According to the equation Eq. 2, the DC output voltage equals the DC input voltage when the duty cycle is 100% and equals zero when the duty cycle is 0%. In this regard, when the buck-boost converter 12 operates in the buck mode, the DC output voltage is less than or equal to the DC input voltage.

When the buck-boost converter 12 is operating in the boost mode without supplying the electrical current to the load circuit, the DC output voltage is proportionally related to the DC input voltage and the duty-cycle and can be expressed by equation Eq. 3 below.

$$V_{OUT} = V_{IN}/(1-D) \qquad \text{(Eq. 3)}$$

According to the equation Eq. 3, the DC output voltage equals the DC input voltage when the duty cycle is 0% and is greater than the DC input voltage when the duty cycle is greater than 0%. In this regard, when the buck-boost converter 12 operates in the boost mode, the DC output voltage is greater than or equal to the DC input voltage.

As such, the buck-boost converter 12 is switched to the buck mode when the DC output voltage needs to be less than the DC input voltage and to the boost mode when the DC output voltage needs to be greater than the DC input voltage. In a non-limiting example, the conventional control circuitry 10 that switches the buck-boost converter 12 between the buck mode and the boost mode may be based on a bang-bang controller (BBC) 26.

The BBC 26 is typically configured to abruptly switch between a first state and a second state based on feedback and a switching threshold. For example, the BBC 26 may be provided in a thermostat to control a home air conditioning system. In this example, the single switching threshold is a preset room temperature and the feedback is the current room temperature. Assuming that the preset room temperature is seventy degrees Fahrenheit (70° F.), the BBC 26 in the thermostat abruptly turns the home air conditioning system on (the first state) to cool the home when the current room temperature is greater than 70° F. and abruptly turns the home air conditioning system off (the second state) when the current room temperature is less than or equal to 70° F.

In this regard, when the BBC 26 is provided in the conventional control circuitry 10 to control the buck-boost converter 12, the first state and the second state will be the buck mode and the boost mode, respectively. The feedback to the BBC 26 may be the DC output voltage and the single switching threshold may be the duty-cycle of the buck-boost converter 12. As such, when the buck-boost converter 12 is operating in the buck mode, the BBC 26 is configured to switch the buck-boost converter 12 to the boost mode when the duty cycle of the buck-boost converter 12 becomes 100%. In contrast, when the buck-boost converter 12 is operating in the boost mode, the BBC 26 is configured to switch the buck-boost converter 12 back to the buck mode when the duty cycle becomes 0%.

FIG. 2A is an exemplary graph 28 illustrating abrupt change in the DC output voltage when the BBC 26 in the conventional control circuitry 10 of FIG. 1 switches the buck-boost converter 12 from the buck mode to the boost mode. Elements of FIG. 1 are referenced in connection with FIG. 2A and will not be re-described herein.

With reference to FIG. 2A, in a non-limiting example, the BBC 26 is configured to switch the buck-boost converter 12 from the buck mode to the boost mode when the duty-cycle in the buck mode becomes 100% at time $T_1$. In this regard, the buck-boost converter 12 operates in the buck mode between time $T_0$ and time $T_1$ and the DC output voltage is less than or equal to the DC input voltage. At time $T_1$, the duty-cycle becomes 100%, thus causing the BBC 26 to switch the buck-boost converter 12 to the boost mode. As a result, the DC output voltage abruptly changes from being less than or equal to the DC input voltage to being greater than or equal to the DC input voltage at time $T_1$.

According to the equation Eq. 2, when the duty-cycle becomes 100% in the buck mode, the DC output voltage equals the DC input voltage. Accordingly, the square wave 16 becomes the continuous wave 22 that corresponds to the logical HIGH. Ideally, when the BBC 26 switches the buck-boost converter 12 to the boost mode at time $T_1$, the DC output voltage is maintained at the DC input voltage to enable a smooth transition from the buck mode to the boost mode. According to the equation Eq. 3 and the discussions above, this would require the duty-cycle of the buck-boost converter 12 to instantaneously change from 100% to 0% at time $T_1$. Accordingly, the continuous wave 22, which corresponds to the logical HIGH in the buck mode, would instantaneously change at time $T_1$ to the continuous wave 24 that corresponds to the logical LOW in the boost mode. However, such instantaneous change in the duty-cycle may not be possible given inherent processing delays in the BBC 26 and the buck-boost converter 12. Consequently, significant voltage error may occur at time $T_1$.

In this regard, FIG. 2B is an exemplary graph 30 illustrating a voltage error (sometimes referred to as $V_{ERR}$) caused by the BBC 26 when switching the buck-boost converter 12 of FIG. 1 from the buck mode to the boost mode at time $T_1$. Elements of FIGS. 1 and 2A are referenced in connection with FIG. 2B and will not be re-described herein.

With reference to FIG. 2B, in a non-limiting example, the DC input voltage is three and eight-tenths volts (3.8 V). At time $T_1$, the BBC 26 switches the buck-boost converter 12 from the buck mode to the boost mode as the duty-cycle reaches 100% and the DC output voltage reaches the DC input voltage. Due to the inherent processing delays associated with the BBC 26 and the buck-boost converter 12, the duty-cycle is unable to instantaneously change to 0%. For example, if the duty-cycle only changes from 100% to one percent (1%) at time $T_1$, the DC output voltage will be three and eighty-four-hundreths volts (3.84 V) according to the equation Eq. 3. Thus, the voltage error of forty millivolts (40 mV) will result. In some cases, the voltage error could be as high as one hundred and forty millivolts (140 mV).

The voltage error may cause operational issues or even damage to a load circuitry (not shown) receiving the DC output voltage, especially those load circuitries having a low degree of tolerance to voltage variations. As such, it is desirable to reduce the voltage error when switching the buck-boost converter 12 between the buck mode and the boost mode.

Figure 3:
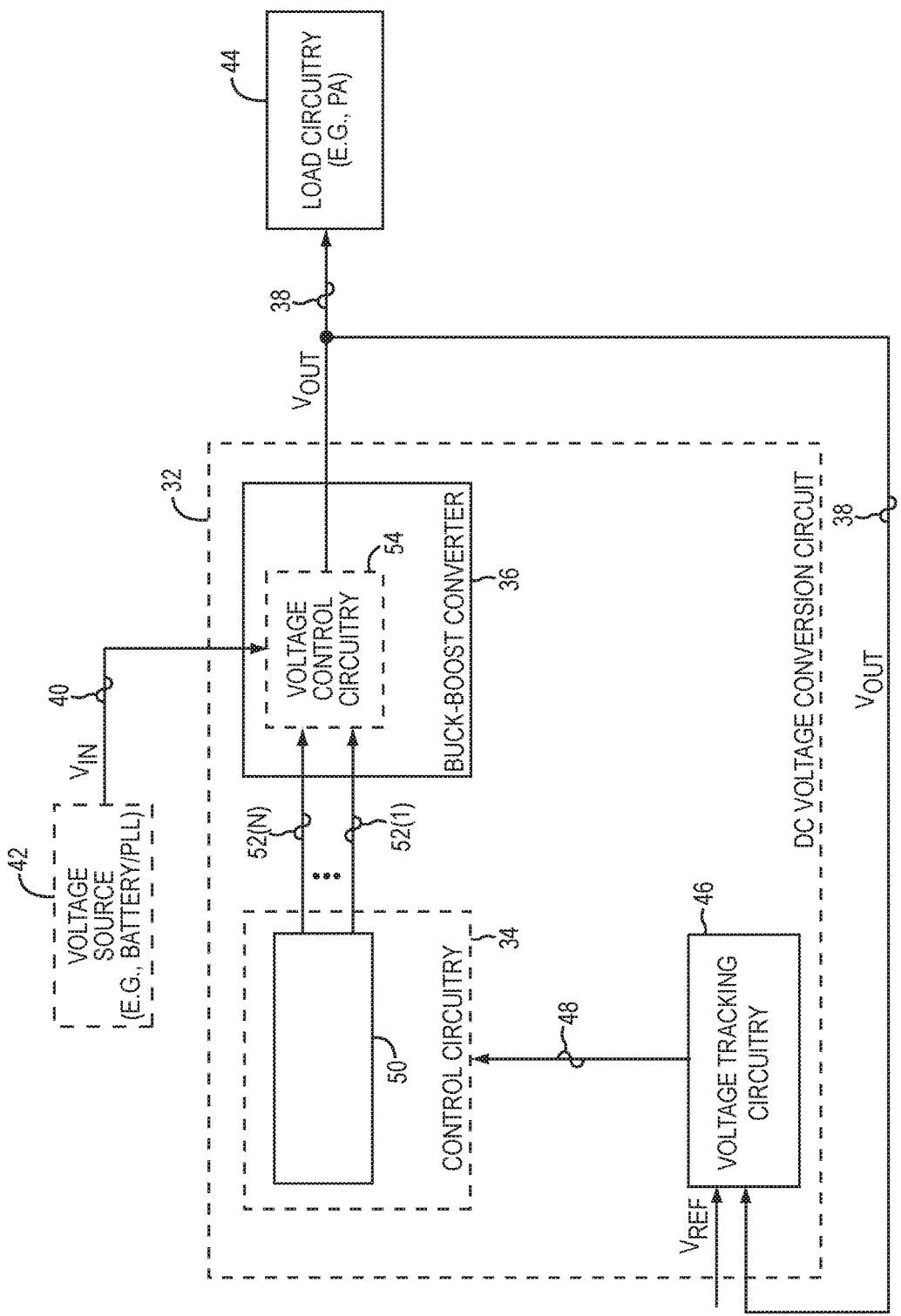
FIG. 3 is a schematic diagram of an exemplary DC voltage conversion circuit in which a control circuitry is configured to reduce voltage error when switching a buck-boost converter between the buck mode and the boost mode.

In this regard, FIG. 3 is a schematic diagram of an exemplary DC voltage conversion circuit 32 in which a control circuitry 34 is configured to reduce voltage error when switching a buck-boost converter 36 between the buck mode and the boost mode.

With reference to FIG. 3, the buck-boost converter 36 is configured to generate a DC output voltage 38 based on a DC input voltage 40 received from a voltage source 42. In a non-limiting example, the voltage source 42 may be a battery. In another non-limiting example, the voltage source 42 may be a phase-locked loop (PLL). The DC output voltage 38 is provided to a load circuitry 44, which may be a power amplifier (PA), for example.

The DC voltage conversion circuit 32 also comprises a voltage tracking circuitry 46 that compares the DC output voltage 38 against a reference voltage (sometimes referred to as $V_{REF}$) to generate a DC voltage feedback 48. In a non-limiting example, if the reference voltage represents a target voltage for the load circuitry 44, the DC voltage feedback 48 then indicates a differential between the DC output voltage 38 received by the load circuitry 44 and the target voltage for the load circuitry 44.

Unlike the conventional control circuitry 10 of FIG. 1, which abruptly switches the buck-boost converter 12 between the buck mode and the boost mode based solely on the duty cycle, the control circuitry 34 is configured to gradually switch the buck-boost converter 36 from the buck mode to the boost mode, or vice versa, based on a plurality of voltage thresholds. The control circuitry 34 comprises a voltage selection circuitry 50 configured to receive the DC voltage feedback 48 from the voltage tracking circuitry 46. The voltage selection circuitry 50 then compares the DC voltage feedback 48 against the plurality of voltage thresholds and generates a plurality of voltage selection signals 52(1)-52(N) that collectively define a lower boundary and an upper boundary of the DC output voltage 38. Based on the plurality of voltage selection signals 52(1)-52(N), a voltage control circuitry 54, which may be provided in the buck-boost converter 36, for example, controls the buck-boost converter 36 to output the DC output voltage 38 between the lower boundary and the upper boundary. As such, the control circuitry 34 is no longer forced to instantaneously transition from 100% duty-cycle to 0% duty-cycle when switching the buck-boost converter 36 from the buck mode to the boost mode. Instead, the control circuitry 34 may toggle the buck-boost converter 36 between the buck mode and the boost mode based on the plurality of voltage selection signals 52(1)-52(N) before settling the buck-boost converter 36 in the boost mode. To help understand how the voltage selection circuitry 50 generates the plurality of voltage selection signals 52(1)-52(N) based on the plurality of voltage thresholds, FIG. 4A is provided and discussed next as a non-limiting example.

Figure 4A:
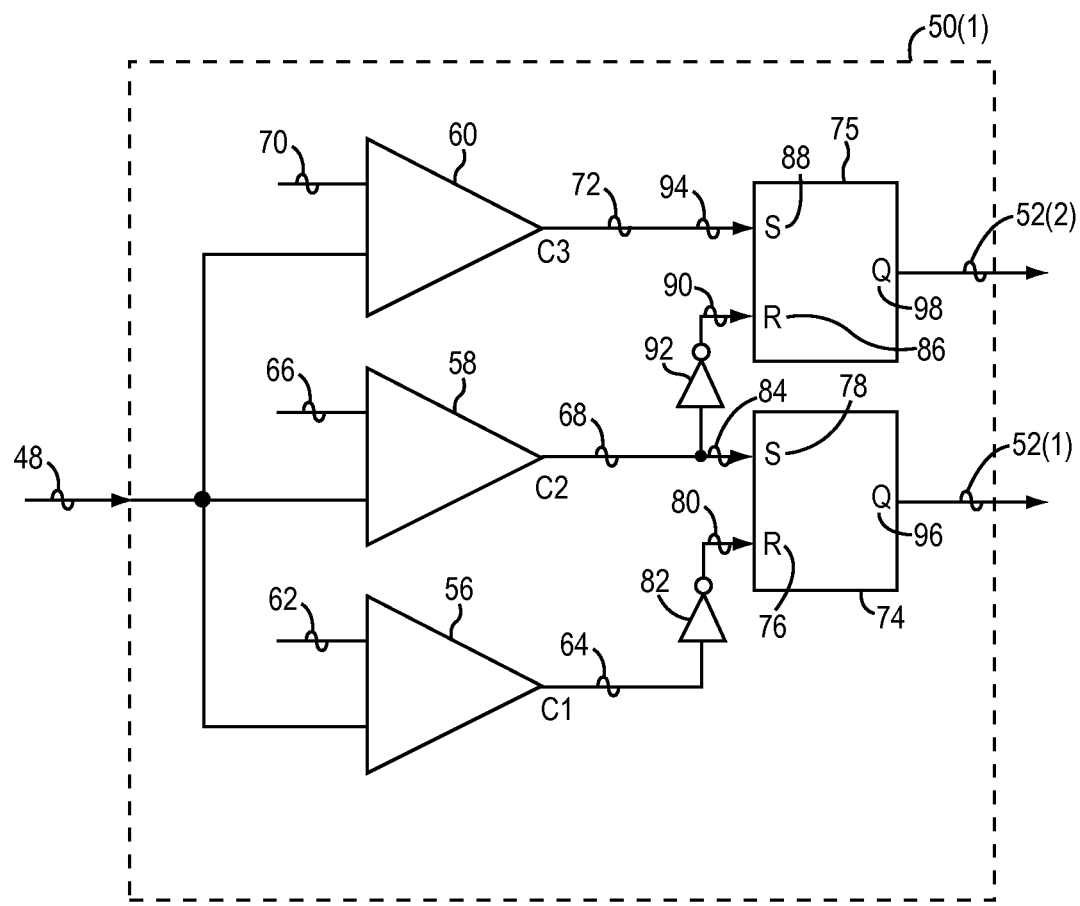
FIG. 4A is a schematic diagram of an exemplary voltage selection circuitry that enables the control circuitry of FIG. 3 to reduce the voltage error when switching the buck-boost converter between the buck mode and the boost mode.

In this regard, FIG. 4A is a schematic diagram of an exemplary voltage selection circuitry 50(1) that enables the control circuitry 34 of FIG. 3 to reduce the voltage error when switching the buck-boost converter 36 between the buck mode and the boost mode. Elements of FIG. 3 are referenced in connection with FIG. 4A and will not be re-described herein.

For the convenience of illustration and discussion, the voltage selection circuitry 50(1) is shown to generate voltage selection signal 52(1) and voltage selection signal 52(2) among the plurality of voltage selection signals 52(1)-52(N). The voltage selection signal 52(1) and the voltage selection signal 52(2) are herein referred to as the first voltage selection signal 52(1) and the second voltage selection signal 52(2), respectively.

With reference to FIG. 4A, the voltage selection circuitry 50(1) comprises a first comparator 56, a second comparator 58, and a third comparator 60. The first comparator 56 is configured to receive and compare the DC voltage feedback 48 against a first voltage threshold 62 to generate a first indication signal (sometimes referred to as C1) 64. The second comparator 58 is configured to receive and compare the DC voltage feedback 48 against a second voltage threshold 66 to generate a second indication signal (sometimes referred to as C2) 68. The third comparator 60 is configured to receive and compare the DC voltage feedback 48 against a third voltage threshold 70 to generate a third indication signal (sometimes referred to as C3) 72. In a non-limiting example, the third voltage threshold 70 is greater than the second voltage threshold 66, and the second voltage threshold 66 is greater than the first voltage threshold 62. In another non-limiting example, the first voltage threshold 62, the second voltage threshold 66, and the third voltage threshold 70 are one volt (1 V), one and four-tenths volts (1.4 V), and one and eight-tenths volts (1.8 V), respectively.

The voltage selection circuitry 50(1) also comprises a first latch circuitry 74 and a second latch circuitry 75. The first latch circuitry 74 has a first reset (R) input 76 and a first source (S) input 78. The first R input 76 receives a first R signal 80 from a first inverter 82 that generates the first R signal 80 by inverting the first indication signal 64. The first S input 78 receives the second indication signal 68 as a first S signal 84. The second latch circuitry 75 has a second R input 86 and a second S input 88. The second R input 86 receives a second R signal 90 from a second inverter 92 that generates the second R signal 90 by inverting the second indication signal 68. The second S input 88 receives the third indication signal 72 as a second S signal 94. The first latch circuitry 74 and the second latch circuitry 75 generate the first voltage selection signal 52(1), which is also referred to as Q signal 52(1), and the second voltage selection signal 52(2), which is also referred to as Q signal 52(2), from a first Q output 96 and a second Q output 98, respectively.

In a first non-limiting example, the first latch circuitry 74 and the second latch circuitry 75 are each enabled by a cross-coupled negative-OR (NOR) logic. The cross-coupled NOR logic operates according to the NOR logic truth table (Table 1) below.

TABLE 1

| R Signal (80/90) | S Signal (84/94) | Q Signal (52(1)/52(2)) |
|---|---|---|
| 1 | 1 | Restricted |
| 1 | 0 | 0 |
| 0 | 1 | 1 |
| 0 | 0 | Hold |

According to Table 1, the Q signal 52(1)/52(2) is in a restricted state when the R signal 80/90 and the S signal 84/94 are both logical ones. In this regard, the respective state of the Q signal 52(1)/52(2) may be non-deterministic and metastable. When the R signal 80/90 is logical one and the S signal 84/94 is logical zero, the Q signal 52(1)/52(2) is logical zero. When the R signal 80/90 is logical zero and the S signal 84/94 is logical one, the Q signal 52(1)/52(2) is logical one. When the R signal 80/90 and the S signal 84/94 are both logical zeros, the Q signal 52(1)/52(2) is in a hold state in which the Q signal 52(1)/52(2) maintains its previous state. For example, if the R signal 80/90 is logical one and the S signal 84/94 is logical zero, the Q signal 52(1)/52(2) will be logical zero. If the R signal 80/90 changes from logical one to logical zero and the S signal 84/94 remains as logical zero, the Q signal 52(1)/52(2) will be held at logical zero.

According to one non-limiting example, the first comparator 56, the second comparator 58, and the third comparator 60 may generate the first indication signal 64, the second indication signal 68, and the third indication signal 72 as logical ones when the DC voltage feedback 48 is greater than the first voltage threshold 62, the second voltage threshold 66, and the third voltage threshold 70, respectively. Accordingly, the first comparator 56, the second comparator 58, and the third comparator 60 may generate the first indication signal 64, the second indication signal 68, and the third indication signal 72 as logical zeros when the DC voltage feedback 48 is less than or equal to the first voltage threshold 62, the second voltage threshold 66, and the third voltage threshold 70, respectively. In this regard, operations of the voltage selection circuitry 50(1) can be summarized in Table 2 below.

TABLE 2

| DC Voltage Feedback (48) | C1 (64) | C2 (68) | C3 (72) | R (80) | S (84) | R (90) | S (94) | Q (52(1)) | Q (52(2)) |
|---|---|---|---|---|---|---|---|---|---|
| ≤ first voltage threshold (62) | 0 | 0 | 0 | 1 | 0 | 1 | 0 | 0 | 0 |
| > first voltage threshold (62) & ≤ second voltage threshold (66) | 1 | 0 | 0 | 0 | 0 | 1 | 0 | 0 | 0 |
| > second voltage threshold (66) & ≤ third voltage threshold (70) | 1 | 1 | 0 | 0 | 1 | 0 | 0 | 1 | 0 |
| > third voltage threshold (70) | 1 | 1 | 1 | 0 | 1 | 0 | 1 | 1 | 1 |

According to Table 2, when the DC voltage feedback 48 is less than or equal to the first voltage threshold 62, the first indication signal 64, the second indication signal 68, and the third indication signal 72 are all logical zeros. The first indication signal 64 is inverted by the first inverter 82 to generate the first R signal 80 as logical one. The second indication signal 68 is inverted by the second inverter 92 to generate the second R signal 90 as logical one. Meanwhile, the first S signal 84 and the second S signal 94 are both logical zeros. According to Table 1, the first voltage selection signal 52(1) and the second voltage selection signal 52(2) that are respectively outputted from the first Q output 96 and the second Q output 98 are both logical zeros. When the first voltage selection signal 52(1) and the second voltage selection signal 52(2) are both logical zeros, the lower boundary and the upper boundary of the DC output voltage 38 are both defined as a ground (GND) voltage (now shown).

When the DC voltage feedback 48 is greater than the first voltage threshold 62 and less than or equal to the second voltage threshold 66, the first indication signal 64 turns into logical one while the second indication signal 68 and the third indication signal 72 remain logical zeros. According to Table 1, the first voltage selection signal 52(1) is held at logical zero and the second voltage selection signal 52(2) remains logical zero. As such, the lower boundary and the upper boundary of the DC output voltage 38 are unchanged.

When the DC voltage feedback 48 is greater than the second voltage threshold 66 and less than or equal to the third voltage threshold 70, the first indication signal 64 and the second indication signal 68 are both logical ones while the third indication signal 72 remains logical zero. The first indication signal 64 is inverted by the first inverter 82 to generate the first R signal 80 as logical zero. The first S signal 84, which is the same as the second indication signal 68, becomes logical one. The second indication signal 68 is inverted by the second inverter 92 to generate the second R signal 90 as logical zero. The second S signal 94 remains logical zero. According to Table 1, the first voltage selection signal 52(1) becomes logical one and the second voltage selection signal 52(2) remains logical zero. In this regard, the lower boundary of the DC output voltage 38 is the GND voltage and the upper boundary of the DC output voltage 38 is the DC input voltage 40.

When the DC voltage feedback 48 becomes greater than the third voltage threshold 70, the first indication signal 64, the second indication signal 68, and the third indication signal 72 are all logical ones. The first indication signal 64 is inverted by the first inverter 82 to generate the first R signal 80 as logical zero. The second indication signal 68 is inverted by the second inverter 92 to generate the second R signal 90 as logical zero. The first S signal 84 and the second S signal 94 both are logical ones. According to Table 1, the first voltage selection signal 52(1) and the second voltage selection signal 52(2) both become logical ones. As such, the lower boundary of the DC output voltage 38 is the DC input voltage 40 while the upper boundary of the DC output voltage 38 is greater than the DC input voltage 40. In a non-limiting example, the upper boundary of the DC output voltage 38 may be one and a half times the DC input voltage 40 or two times the DC input voltage 40.

The relationships between the first voltage selection signal 52(1), the second voltage selection signal 52(2), the lower boundary of the DC output voltage 38, and the upper boundary of the DC output voltage 38 are summarized in Table 3 below.

TABLE 3

| First Voltage Selection Signal (52(1)) | Second Voltage Selection Signal (52(2)) | Lower Boundary of $V_{OUT}$ (38) | Upper Boundary of $V_{OUT}$ (38) |
|---|---|---|---|
| 0 | 0 | GND Voltage | GND Voltage |
| 1 | 0 | GND Voltage | $V_{IN}$ (40) |
| 1 | 1 | $V_{IN}$ (40) | >$V_{IN}$ (40) |

In a second non-limiting example, the first latch circuitry 74 and the second latch circuitry 75 are each enabled by a cross-coupled negative-AND (NAND) logic. The cross-coupled NAND logic operates according to the NAND logic truth table (Table 4) below.

TABLE 4

| R Signal (80/90) | S Signal (84/94) | Q Signal (52(1)/52(2)) |
|---|---|---|
| 0 | 0 | Restricted |
| 1 | 0 | 1 |
| 0 | 1 | 0 |
| 1 | 1 | Hold |

According to Table 4, the Q signal 52(1)/52(2) is in a restricted state when the R signal 80/90 and the S signal 84/94 are both logical zeros. In this regard, the respective state of the Q signal 52(1)/52(2) may be non-deterministic and metastable. When the R signal 80/90 is logical one and the S signal 84/94 is logical zero, the Q signal 52(1)/52(2) is logical one. When the R signal 80/90 is logical zero and the S signal 84/94 is logical one, the Q signal 52(1)/52(2) is logical zero. When the R signal 80/90 and the S signal 84/94 are both logical ones, the Q signal 52(1)/52(2) is in a hold state in which the Q signal 52(1)/52(2) maintains its previous state.

According to another non-limiting example, the first comparator 56, the second comparator 58, and the third comparator 60 may generate the first indication signal 64, the second indication signal 68, and the third indication signal 72 as logical zeros when the DC voltage feedback 48 is greater than the first voltage threshold 62, the second voltage threshold 66, and the third voltage threshold 70, respectively. Accordingly, the first comparator 56, the second comparator 58, and the third comparator 60 may generate the first indication signal 64, the second indication signal 68, and the third indication signal 72 as logical ones when the DC voltage feedback 48 is less than or equal to the first voltage threshold 62, the second voltage threshold 66, and the third voltage threshold 70, respectively. In this regard, operations of the voltage selection circuitry 50(1) can be summarized in Table 5 below.

TABLE 5

| DC Voltage Feedback (48) | C1 (64) | C2 (68) | C3 (72) | R (80) | S (84) | R (90) | S (94) | Q (52(1)) | Q (52(2)) |
|---|---|---|---|---|---|---|---|---|---|
| ≤ first voltage threshold (62) | 1 | 1 | 1 | 0 | 1 | 0 | 1 | 0 | 0 |
| > first voltage threshold (62) & ≤ second voltage threshold (66) | 0 | 1 | 1 | 1 | 1 | 0 | 1 | 0 | 0 |
| > second voltage threshold (66) & ≤ third voltage threshold (70) | 0 | 0 | 1 | 1 | 0 | 1 | 1 | 1 | 0 |
| > third voltage threshold (70) | 0 | 0 | 0 | 1 | 0 | 1 | 0 | 1 | 1 |

According to Table 5, when the DC voltage feedback 48 is less than or equal to the first voltage threshold 62, the first indication signal 64, the second indication signal 68, and the third indication signal 72 are all logical ones. The first indication signal 64 is inverted by the first inverter 82 to generate the first R signal 80 as logical zero. The second indication signal 68 is inverted by the second inverter 92 to generate the second R signal 90 as logical zero. Meanwhile, the first S signal 84 and the second S signal 94 are both logical ones. According to Table 4, the first voltage selection signal 52(1) and the second voltage selection signal 52(2) that are respectively outputted from the first Q output 96 and the second Q output 98 are both logical zeros. Thus, the lower boundary and the upper boundary of the DC output voltage 38 are both defined as the GND voltage.

When the DC voltage feedback 48 is greater than the first voltage threshold 62 and less than or equal to the second voltage threshold 66, the first indication signal 64 turns into logical zero while the second indication signal 68 and the third indication signal 72 remain logical ones. According to Table 4, the first voltage selection signal 52(1) is held at logical zero and the second voltage selection signal 52(2) remains logical zero. As such, the lower boundary and the upper boundary of the DC output voltage 38 are unchanged.

When the DC voltage feedback 48 is greater than the second voltage threshold 66 and less than or equal to the third voltage threshold 70, the first indication signal 64 and the second indication signal 68 are both logical zeros while the third indication signal 72 remains logical one. The first indication signal 64 is inverted by the first inverter 82 to generate the first R signal 80 as logical one. The first S signal 84, which is the same as the second indication signal 68, becomes logical zero. The second indication signal 68 is inverted by the second inverter 92 to generate the second R signal 90 as logical one. The second S signal 94 remains logical one. According to Table 4, the first voltage selection signal 52(1) becomes logical one while the second voltage selection signal 52(2) is held unchanged as logical zero. In this regard, the lower boundary of the DC output voltage 38 is the GND voltage and the upper boundary of the DC output voltage 38 is the DC input voltage 40.

When the DC voltage feedback 48 becomes greater than the third voltage threshold 70, the first indication signal 64, the second indication signal 68, and the third indication signal 72 are all logical zeros. The first indication signal 64 is inverted by the first inverter 82 to generate the first R signal 80 as logical one. The second indication signal 68 is inverted by the second inverter 92 to generate the second R signal 90 as logical one. The first S signal 84 and the second S signal 94 both are logical zeros. According to Table 4, the first voltage selection signal 52(1) and the second voltage selection signal 52(2) both become logical ones. As such, the lower boundary of the DC output voltage 38 is the DC input voltage 40 while the upper boundary of the DC output voltage 38 is greater than the DC input voltage 40. In a non-limiting example, the upper boundary of the DC output voltage 38 may be one and a half times the DC input voltage 40 or two times the DC input voltage 40.

Figure 4B:
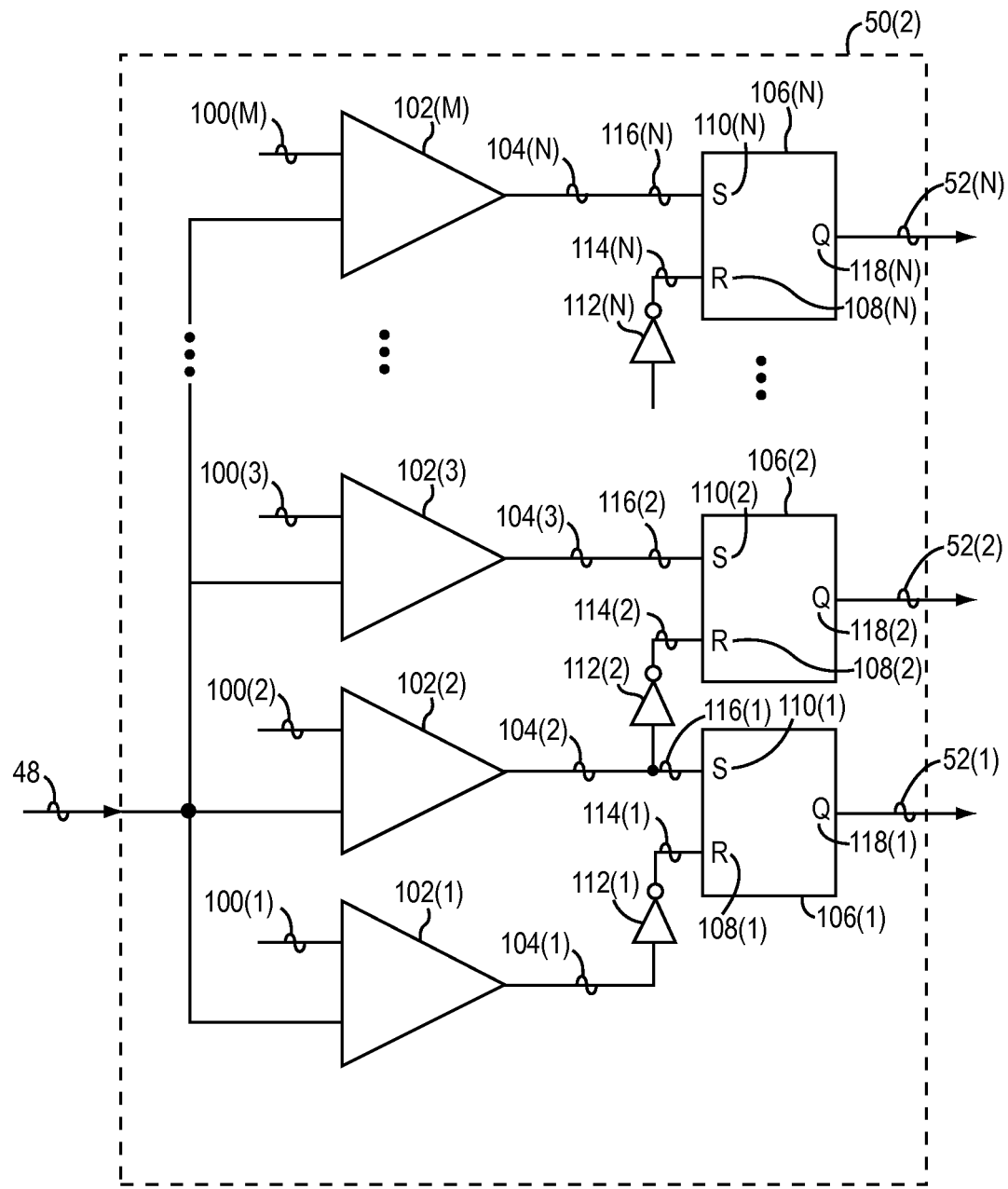
FIG. 4B is a schematic diagram of an exemplary voltage selection circuitry configured to generate a plurality of voltage selection signals based on a plurality of voltage thresholds.

The configuration and operation of the voltage selection circuitry 50(1) is applicable to the voltage selection circuitry 50 of FIG. 3 that is configured to generate the plurality of voltage selection signals 52(1)-52(N) as well. In this regard, FIG. 4B is a schematic diagram of an exemplary voltage selection circuitry 50(2) configured to generate the plurality of voltage selection signals 52(1)-52(N) based on a plurality of voltage thresholds 100(1)-100(M). Elements of FIG. 3 are referenced in connection with FIG. 4B and will not be re-described herein.

With reference to FIG. 4B, the voltage selection circuitry 50(2) comprises a plurality of comparators 102(1)-102(M). Each of the plurality of comparators 102(1)-102(M) corresponds to a respective voltage threshold among the plurality of voltage thresholds 100(1)-100(M). The plurality of comparators 102(1)-102(M) is configured to generate a plurality of indication signals 104(1)-104(M) by comparing the DC voltage feedback 48 against the plurality of voltage thresholds 100(1)-100(M), respectively.

The voltage selection circuitry 50(2) also comprises a plurality of latch circuitries 106(1)-106(N) configured to generate the plurality of voltage selection signals 52(1)-52(N), respectively, based on the plurality of indication signals 104(1)-104(M). The number of the plurality of latch circuitries 106(1)-106(N) required in the voltage selection circuitry 50(2) (sometimes referred to as $N_{LATCH}$) depends on the number of the plurality of comparators 102(1)-102(M) (sometimes referred to as $N_{COMPARATOR}$) and thus, the number of the plurality of voltage thresholds 100(1)-100(M). The number of the plurality of latch circuitries 106(1)-106(N) can be determined based on equation Eq. 4 below.

$$N_{LATCH} = \lceil \log_2(N_{COMPARATOR}) \rceil \quad \text{(Eq. 4)}$$

Hence, according to the equation Eq. 4, the number of the plurality of latch circuitries 106(1)-106(N) is determined by rounding up to an upper integer of a logarithm base two ($\log_2$) of the number of the plurality of comparators 102(1)-102(M).

In a non-limiting example, each latch circuitry among the plurality of latch circuitries 106(1)-106(N) may be enabled by a cross-coupled NOR logic. In another non-limiting example, each latch circuitry among the plurality of latch circuitries 106(1)-106(N) may be enabled by a cross-coupled NAND logic. In this regard, the plurality of latch circuitries 106(1)-106(N) comprises a plurality of R inputs 108(1)-108(N) and a plurality of S inputs 110(1)-110(N), respectively. The plurality of R inputs 108(1)-108(N) is coupled to a plurality of inverters 112(1)-112(N) to receive a plurality of R signals 114(1)-114(N), respectively. The plurality of S inputs 110(1)-110(N) is configured to receive a plurality of S signals 116(1)-116(N), respectively. According to one non-limiting configuration, the plurality of latch circuitries 106(1)-106(N) is configured to output the plurality of voltage selection signals 52(1)-52(N) from a plurality of Q outputs 118(1)-118(N), respectively.

As previously discussed with reference to FIG. 3, by providing the plurality of voltage selection signals 52(1)-52(N) based on the plurality of voltage thresholds 100(1)-100(M), the control circuitry 34 is no longer forced to instantaneously transition from 100% duty-cycle to 0% duty-cycle when switching the buck-boost converter 36 from the buck mode to the boost mode. Instead, the control circuitry 34 may toggle the buck-boost converter 36 between the buck mode and the boost mode based on the plurality of voltage selection signals 52(1)-52(N) before settling the buck-boost converter 36 in the boost mode.

Figure 5A:
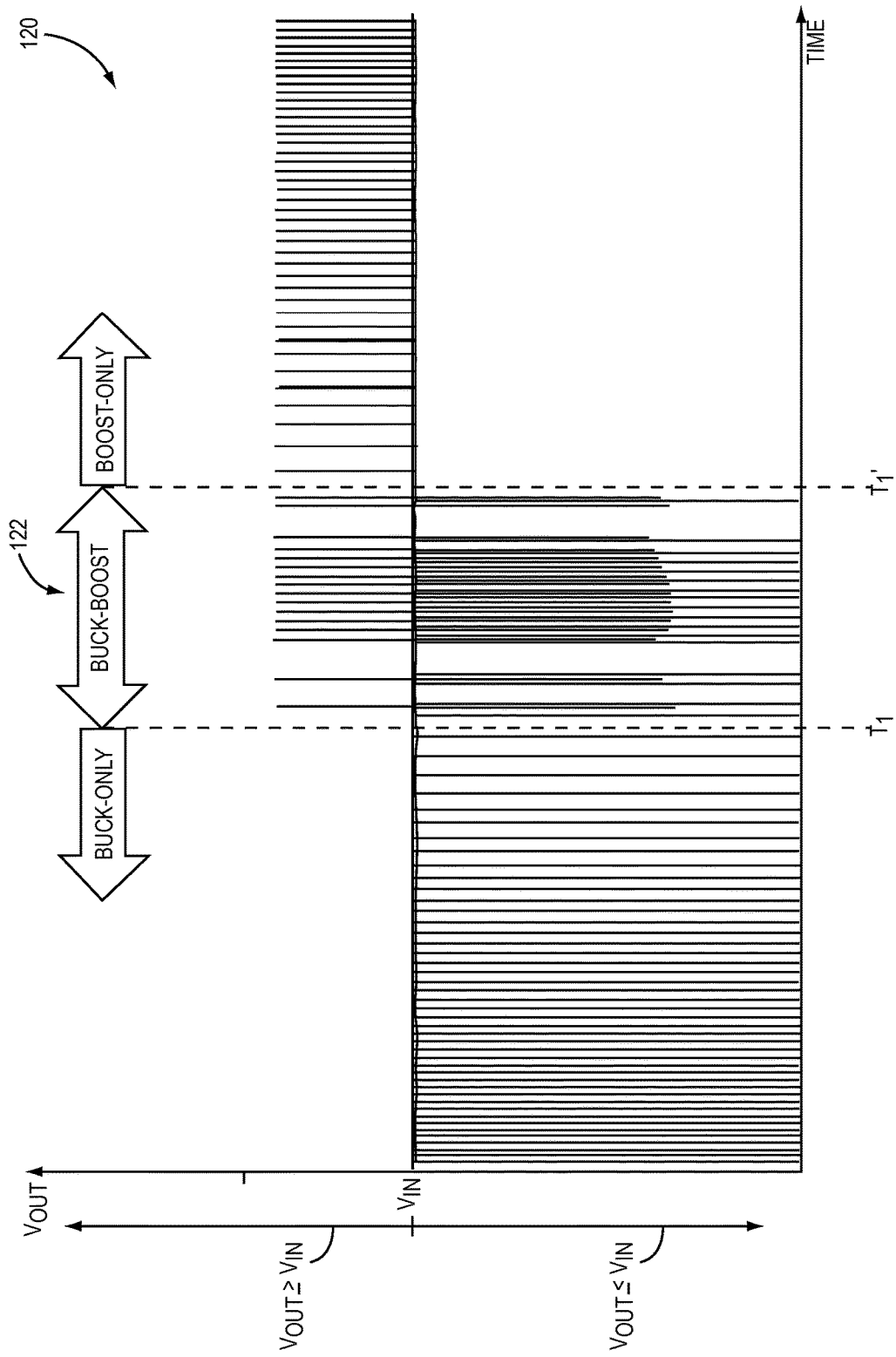
FIG. 5A is an exemplary graph illustrating a buck-boost transition region in which the control circuitry of FIG. 3 toggles the buck-boost converter between the buck mode and the boost mode before settling the buck-boost converter in a buck-only operation or a boost-only operation.

In this regard, FIG. 5A is an exemplary graph 120 illustrating a buck-boost transition region 122 in which the control circuitry 34 of FIG. 3 toggles the buck-boost converter 36 between the buck mode and the boost mode based on the plurality of voltage selection signals 52(1)-52(N) before settling the buck-boost converter 36 in a buck-only operation or a boost-only operation. Elements of FIG. 3 are referenced in connection with FIG. 5A and will not be re-described herein.

With reference to FIG. 5A, prior to time $T_1$, the buck-boost converter 36 is engaged in the buck-only operation and the DC output voltage 38 is less than or equal to the DC input voltage 40. At time $T_1$, the control circuitry 34 begins switching the buck-boost converter 36 from the buck-only operation to the boost-only operation. Inside the buck-boost transition region 122, which starts at time $T_1$ and ends at time $T_1'$, the control circuitry 34 toggles the buck-boost converter 36 between the buck mode and the boost mode in response to the plurality of voltage selection signals 52(1)-52(N) generated by the voltage selection circuitry 50(1) of FIG. 4A or the voltage selection circuitry 50(2) of FIG. 4B. Finally, at time $T_1'$, the control circuitry 34 switches the buck-boost converter 36 to the boost-only operation in which the DC output voltage 38 remains greater than the DC input voltage 40.

Because the buck-boost converter 36 is toggled between the buck mode and the boost mode in the buck-boost transition region 122, the DC output voltage 38 varies as well. As a result, the DC output voltage 38 may be averaged out in the buck-boost transition region 122, thus enabling a gradual and smooth transition between the buck-only operation and the boost-only operation.

Figure 5B:
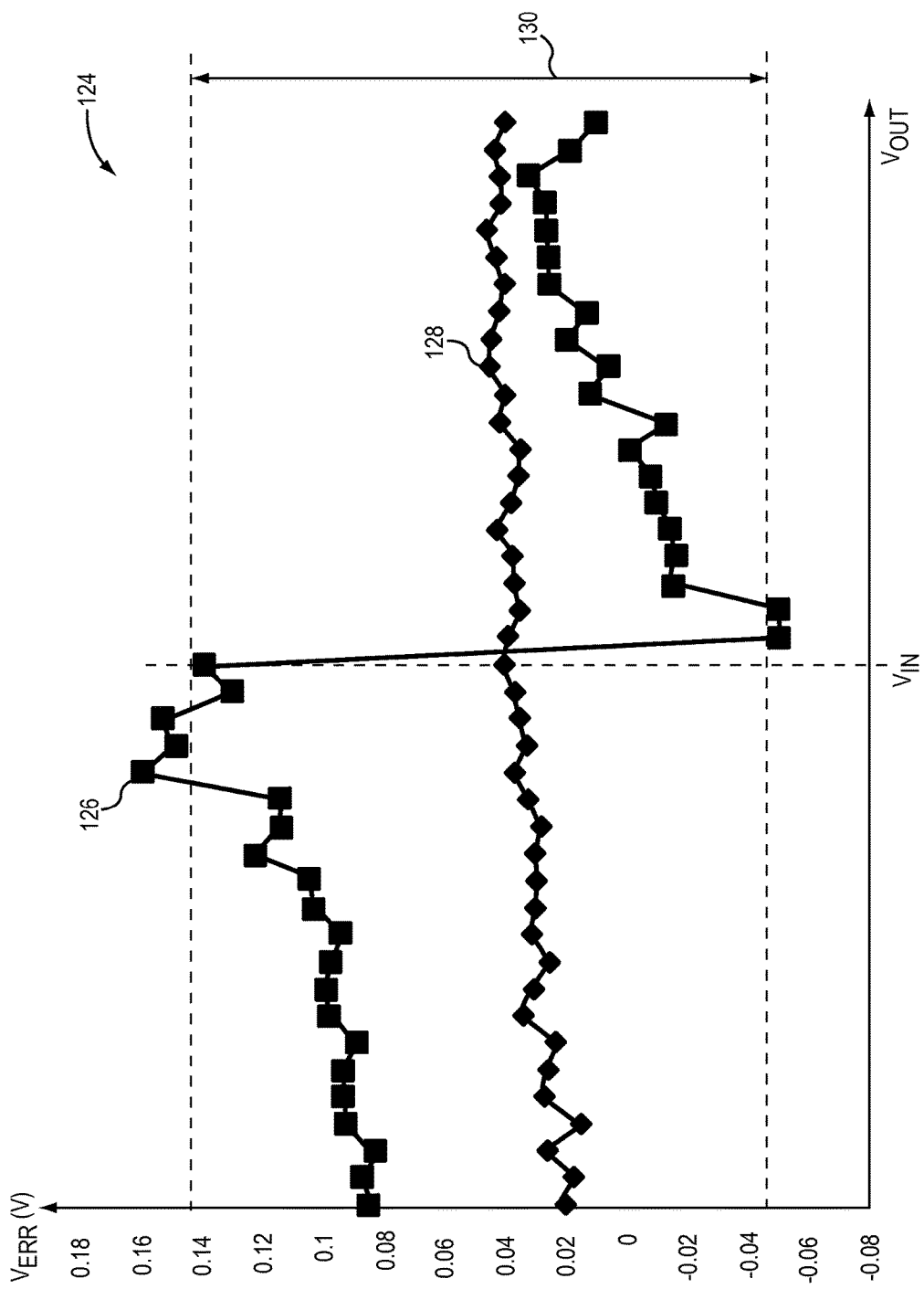
FIG. 5B is an exemplary graph illustrating a significant voltage error reduction achieved by the control circuitry of FIG. 3 when switching the buck-boost converter between the buck mode and the boost mode.

In this regard, FIG. 5B is an exemplary graph 124 illustrating a significant voltage error reduction achieved by the control circuitry 34 of FIG. 3 when switching the buck-boost converter 36 between the buck mode and the boost mode. Elements of FIGS. 1 and 3 are referenced in connection with FIG. 5B and will not be re-described herein.

With reference to FIG. 5B, the graph 124 includes a first voltage error curve 126 illustrating the voltage error associated with the buck-boost converter 12 of FIG. 1. The graph 124 also includes a second voltage error curve 128 illustrating the voltage error associated with the buck-boost converter 36 of FIG. 3. As illustrated by the first voltage error curve 126, the buck-boost converter 12 experiences a voltage variation 130 when the buck-boost converter 12 is abruptly switched between the buck mode and the boost mode by the conventional control circuitry 10. In contrast, as illustrated by the second voltage error curve 128, the voltage error associated the buck-boost converter 36 is insignificant as a result of being controlled by the control circuitry 34 based on the plurality of voltage selection signals 52(1)-52(N).

Those skilled in the art will recognize improvements and modifications to the embodiments of the present disclosure. All such improvements and modifications are considered within the scope of the concepts disclosed herein and the claims that follow.

What is claimed is:

1. A direct current (DC) voltage conversion circuit, comprising:
    a buck-boost converter configured to generate a DC output voltage based on a DC input voltage provided by a voltage source;
    a voltage selection circuitry configured to:
        receive a DC voltage feedback indicative of a differential between the DC output voltage and a reference voltage; and
        compare the DC voltage feedback against a plurality of voltage thresholds to generate a plurality of voltage selection signals that collectively define a lower boundary and an upper boundary of the DC output voltage; and
    a voltage control circuitry configured to control the buck-boost converter to generate the DC output voltage between the lower boundary and the upper boundary defined by the plurality of voltage selection signals.

2. The DC voltage conversion circuit of claim 1 wherein the voltage selection circuitry comprises:
    a plurality of comparators each corresponding to a respective voltage threshold among the plurality of voltage thresholds, the plurality of comparators configured to generate a plurality of indication signals by comparing the DC voltage feedback against the plurality of voltage thresholds, respectively; and
    a plurality of latch circuitries coupled to the plurality of comparators and configured to generate the plurality of voltage selection signals based on the plurality of indication signals.

3. The DC voltage conversion circuit of claim 2 wherein a number of the plurality of latch circuitries is determined by rounding up to an upper integer of a logarithm base two ($\log_2$) of a number of the plurality of comparators.

4. The DC voltage conversion circuit of claim 1 further comprising a voltage tracking circuitry configured to generate the DC voltage feedback by comparing the reference voltage to the DC output voltage received from the buck-boost converter.

5. The DC voltage conversion circuit of claim 1 wherein the voltage selection circuitry comprises:
    a first comparator configured to receive and compare the DC voltage feedback against a first voltage threshold to generate a first indication signal;
    a second comparator configured to receive and compare the DC voltage feedback against a second voltage threshold higher than the first voltage threshold to generate a second indication signal;
    a third comparator configured to receive and compare the DC voltage feedback against a third voltage threshold higher than the second voltage threshold to generate a third indication signal;
    a first latch circuitry configured to:
        receive an inversion of the first indication signal as a first reset (R) signal;
        receive the second indication signal as a first set (S) signal; and
        generate a first voltage selection signal; and
    a second latch circuitry configured to:
        receive an inversion of the second indication signal as a second R signal;
        receive the third indication signal as a second S signal; and
        generate a second voltage selection signal;
    wherein the first voltage selection signal and the second voltage selection signal collectively define the lower boundary and the upper boundary of the DC output voltage.

6. The DC voltage conversion circuit of claim 5 wherein the voltage control circuitry controls the buck-boost converter to output the DC output voltage as a ground voltage when the first voltage selection signal and the second voltage selection signal are both logical zeros.

7. The DC voltage conversion circuit of claim 5 wherein the voltage control circuitry controls the buck-boost converter to output the DC output voltage between a ground voltage and the DC input voltage when the first voltage selection signal and the second voltage selection signal are logical one and logical zero, respectively.

8. The DC voltage conversion circuit of claim 5 wherein the voltage control circuitry controls the buck-boost converter to output the DC output voltage higher than the DC input voltage when the first voltage selection signal and the second voltage selection signal are both logical ones.

9. The DC voltage conversion circuit of claim 8 wherein the voltage control circuitry controls the buck-boost converter to output the DC output voltage that is one and a half times the DC input voltage.

10. The DC voltage conversion circuit of claim 8 wherein the voltage control circuitry controls the buck-boost converter to output the DC output voltage that is two times the DC input voltage.

11. The DC voltage conversion circuit of claim 5 wherein:
the first comparator is further configured to:
generate the first indication signal as logical one if the DC voltage feedback is greater than the first voltage threshold; and
generate the first indication signal as logical zero if the DC voltage feedback is less than or equal to the first voltage threshold;
the second comparator is further configured to:
generate the second indication signal as logical one if the DC voltage feedback is greater than the second voltage threshold; and
generate the second indication signal as logical zero if the DC voltage feedback is greater than the first voltage threshold and less than or equal to the second voltage threshold; and
the third comparator is further configured to:
generate the third indication signal as logical one if the DC voltage feedback is greater than the third voltage threshold; and
generate the third indication signal as logical zero if the DC voltage feedback is greater than the second voltage threshold and less than or equal to the third voltage threshold.

12. The DC voltage conversion circuit of claim 11 wherein:
the first latch circuitry is a first cross-coupled negative-OR (NOR) circuitry configured to output the first voltage selection signal on a first Q output; and
the second latch circuitry is a second cross-coupled NOR circuitry configured to output the second voltage selection signal on a second Q output.

13. The DC voltage conversion circuit of claim 5 wherein:
the first comparator is further configured to:
generate the first indication signal as logical zero if the DC voltage feedback is greater than the first voltage threshold; and
generate the first indication signal as logical one if the DC voltage feedback is less than or equal to the first voltage threshold;
the second comparator is further configured to:
generate the second indication signal as logical zero if the DC voltage feedback is greater than the second voltage threshold; and
generate the second indication signal as logical one if the DC voltage feedback is greater than the first voltage threshold and less than or equal to the second voltage threshold; and
the third comparator is further configured to:
generate the third indication signal as logical zero if the DC voltage feedback is greater than the third voltage threshold; and
generate the third indication signal as logical one if the DC voltage feedback is greater than the second voltage threshold and less than or equal to the third voltage threshold.

14. The DC voltage conversion circuit of claim 13 wherein:
the first latch circuitry is a first cross-coupled negative-AND (NAND) circuitry configured to output the first voltage selection signal on a first Q output; and
the second latch circuitry is a second cross-coupled NAND circuitry configured to output the second voltage selection signal on a second Q output.

15. The DC voltage conversion circuit of claim 5 wherein the first voltage threshold, the second voltage threshold, and the third voltage threshold are one volt (1 V), one and four-tenths volts (1.4 V), and one and eight-tenths volts (1.8 V), respectively.

16. The DC voltage conversion circuit of claim 5 wherein the first voltage threshold, the second voltage threshold, and the third voltage threshold are programmable.

17. The DC voltage conversion circuit of claim 1 wherein the DC input voltage is provided by a battery.

18. The DC voltage conversion circuit of claim 1 wherein the DC input voltage is provided by a phase-locked loop (PLL).

19. The DC voltage conversion circuit of claim 1 configured to provide the DC output voltage to a coupled load circuitry.

20. The DC voltage conversion circuit of claim 1 configured to provide the DC output voltage to a coupled power amplifier (PA).

* * * * *